US009128505B2

(12) United States Patent
Sun et al.

(10) Patent No.: US 9,128,505 B2
(45) Date of Patent: Sep. 8, 2015

(54) VOLTAGE REGULATOR CIRCUIT

(75) Inventors: Amanda Sun, Shanghai (CN); Zhen Yang, Shanghai (CN); Kaihua Zheng, Shanghai (CN)

(73) Assignee: ST-Ericsson SA, Plan-les-Ouates (CH)

( * ) Notice: Subject to any disclaimer, the term of this patent is extended or adjusted under 35 U.S.C. 154(b) by 337 days.

(21) Appl. No.: 13/808,439

(22) PCT Filed: Jul. 5, 2010

(86) PCT No.: PCT/CN2010/001003
§ 371 (c)(1), (2), (4) Date: Jun. 26, 2013

(87) PCT Pub. No.: WO2012/003597
PCT Pub. Date: Jan. 12, 2012

(65) Prior Publication Data

US 2013/0271094 A1 Oct. 17, 2013

(51) Int. Cl.

| | |
|---|---|
| ***G05F 1/10*** | (2006.01) |
| ***H02J 3/12*** | (2006.01) |
| ***G05F 1/625*** | (2006.01) |
| ***G05F 1/575*** | (2006.01) |

(52) U.S. Cl.
CPC ................ *G05F 1/625* (2013.01); *G05F 1/575* (2013.01)

(58) Field of Classification Search
CPC ................................ G05F 1/575; G05F 1/625
USPC ................................ 323/282, 274, 283, 234
See application file for complete search history.

(56) References Cited

U.S. PATENT DOCUMENTS

| | | | | |
|---|---|---|---|---|
| 5,867,015 | A * | 2/1999 | Corsi et al. | 323/316 |
| 5,982,226 | A * | 11/1999 | Rincon-Mora | 327/541 |
| 6,259,238 | B1 | 7/2001 | Hastings | |
| 6,285,246 | B1 * | 9/2001 | Basu | 323/316 |
| 8,143,872 | B2 * | 3/2012 | Lipcsei et al. | 323/282 |
| 8,305,053 | B2 * | 11/2012 | Truong et al. | 323/224 |
| 2002/0105382 | A1 | 8/2002 | Kadanka | |
| 2009/0167365 | A1 | 7/2009 | Turchi et al. | |
| 2012/0299564 | A1 * | 11/2012 | Howes et al. | 323/281 |

FOREIGN PATENT DOCUMENTS

| | | |
|---|---|---|
| CN | 1821922 A | 8/2006 |
| CN | 101379688 A | 3/2009 |

OTHER PUBLICATIONS

Pedro Miguel Antunes Fernandes. High PSRR Low Drop-out Voltage Regulator (LDO). Thesis, Apr. 2009, pp. 1-90, Instituto Superior Técnico, Universidade Técnica de Lisboa.

* cited by examiner

*Primary Examiner* — Jue Zhang
(74) *Attorney, Agent, or Firm* — Coats & Bennett, PLLC

(57) ABSTRACT

A voltage regulator circuit comprises an amplifier (10) having a first input coupled to a first reference voltage node; a power pass element (20) having a control terminal coupled to an output of the amplifier, an input coupled to a power supply input of the voltage regulator circuit, and an output coupled to an output of the voltage regulator circuit; a feedback circuit (30, 31) having an input coupled to the output of the power pass element and an output coupled to a second input of the amplifier; and a compensation module (60) comprising a transistor (61), wherein a gate or base terminal of the transistor is coupled to a second reference voltage node, a drain or collector terminal of the transistor is coupled to the output of the amplifier, and a source or emitter terminal of the transistor is coupled to the power supply input of the voltage regulator circuit. The voltage regulator circuit is capable to increase the power supply rejection ratio of low drop-out voltage regulators.

9 Claims, 2 Drawing Sheets

VOLTAGE REGULATOR CIRCUIT

TECHNICAL FIELD

The present invention relates to voltage regulators.

BACKGROUND

Low drop-out voltage regulators (LDO) are widely used in portable electronic equipment such as a cellular phone, digital cameras, and portable media players, etc., to provide a constant voltage power supply for analog and/or digital circuits. The power supply rejection ratio (PSRR) of the LDO, indicating the capability of suppressing power supply noise from its output, is normally of importance.

A conventional existing LDO is shown in FIG. 1. Such a circuit is e.g. disclosed in U.S. Pat. No. 7,205,831 B2. The existing LDO includes an error amplifier 10, power transistor 20, feedback resistors 30 and 31, load resistors 33 and 34, load capacitor 40. FIG. 1 also shows a power-supply 55, reference voltage $V_{ref}$, as well as output voltage $V_{out}$ 51. In the conventional existing LDO, as shown in FIG. 1, the power supply noise is suppressed by a negative feedback circuit comprising the error amplifier 10 and the power transistor 20.

FIG. 2 is a circuit diagram of a small signal equivalent of a voltage regulator circuit of FIG. 1. As shown in FIG. 2, a transconductor 21 and a resistor 36 represent the transconductance and the drain source resistance, respectively, of the power transistor 20 of FIG. 1. The PSRR for the LDO based on the small signal equivalent shown in FIG. 2 is given by:

$$PSRR = \frac{A_v}{A_{dd}} = \frac{V_{in}}{V_{out}} \approx A_{EA}\beta R_{op} G_{mp} \qquad (1)$$

Av is the open loop gain of negative feedback loop of the LDO, Vin is the voltage of power-supply input 50 of the LDO, and Vout is the voltage of output 51 of the LDO.

Furthermore, $A_{EA}$ is the differential gain of the error amplifier 10, β a feedback factor which is the ratio of the resistance of resistor 30 to the sum of the resistances of the resistor 30 and 31, $R_{op}$ is the drain source resistance of the power transistor 20, and $G_{mp}$ is the transconductance of the power transistor 20.

There is a need for a low drop-out voltage regulator that, for example, consumes a relatively small area, and/or can provide an improved PSRR without necessarily increasing its open loop gain.

SUMMARY OF THE INVENTION

According to one aspect of the present invention, there is provided a voltage regulator circuit comprising: an amplifier having a first input coupled to a first reference voltage node; a power pass element having a control terminal coupled to an output of the amplifier, an input coupled to a power-supply input of the voltage regulator circuit, and an output coupled to an output of the voltage regulator circuit; a feedback circuit having an input coupled to the output of the power pass element and an output coupled to a second input of the amplifier; and a compensation module comprising a transistor, wherein a gate or base terminal of the transistor is coupled to a second reference voltage node, a drain or collector terminal of the transistor is coupled to the output of the amplifier, and a source or emitter terminal of the transistor is coupled to the power-supply input of the voltage regulator circuit.

The compensation module may further comprise a balance unit which is coupled between the output of the amplifier and ground in order to balance the quiescent operation.

The balance unit may comprise a first balance element, a second balance element serially coupled to the first balance element, and a current source coupled between the second balance element and ground.

A control terminal of each of the first balance element and second balance element may be coupled to the power-supply input of the voltage regulator circuit, an input of the first balance element may be coupled to the output of the transistor, and the output of the first balance element may be coupled to an input of the second balance element.

Each of the power pass element and the transistor may be either a P-type MOS transistor or a P-type bipolar transistor. Each of the first balance element and the second balance element may be either a P-type MOS transistor or a P-type bipolar transistor.

The amplifier may be an error amplifier. The combination of the amplifier and the compensation module may be configured such that the power gain of said combination is kept in the range of “1σ1” to “1+σ2”, where the value of σ1 may be $$\frac{0.9}{R_{op} \cdot G_{mp}}$$

and the value of σ2 may be $$\frac{1.1}{R_{op} \cdot G_{mp}},$$

in which the $R_{op}$ represents the drain-source resistance of the power pass element and the $G_{mp}$ represents the transconductance of the power pass element.

The PSRR of LDO would be improved without having to change the open-loop gain of the LDO by utilizing the voltage regulator circuit of the present invention.

BRIEF DESCRIPTION OF THE DRAWINGS

The invention will be better understood with the aid of the description of an embodiment given by way of example and illustrated by the figures, in which.

DETAILED DESCRIPTION

Before the present invention is described, it is to be understood that this invention is not limited to any particular embodiments described, as such may, of course, vary. It is also to be understood that the terms used herein are for the purpose of describing particular embodiments only, and are not intended to be limiting. The scope of the present invention is only limited by the appended claims.

Unless defined otherwise, all technical and scientific terms used herein have the same meaning as commonly understood by one of ordinary skill in the art to which this invention belongs.

It must be noted that as used herein and in the appended claims, the singular forms “a”, “an”, and “the” include plural referents unless the context clearly dictates otherwise. Moreover, it should be noted that the term “power pass element” may also be known as “power transistor” or “pass element”.

The present invention provides a voltage regulator circuit to obtain a relatively high power supply rejection ratio (PSRR) by means of control of the power gain of the error amplifier without increasing the open-loop gain of the LDO. In the detailed description that follows, like element numerals are used to describe like elements illustrated in one or more figures.

Figure 1:
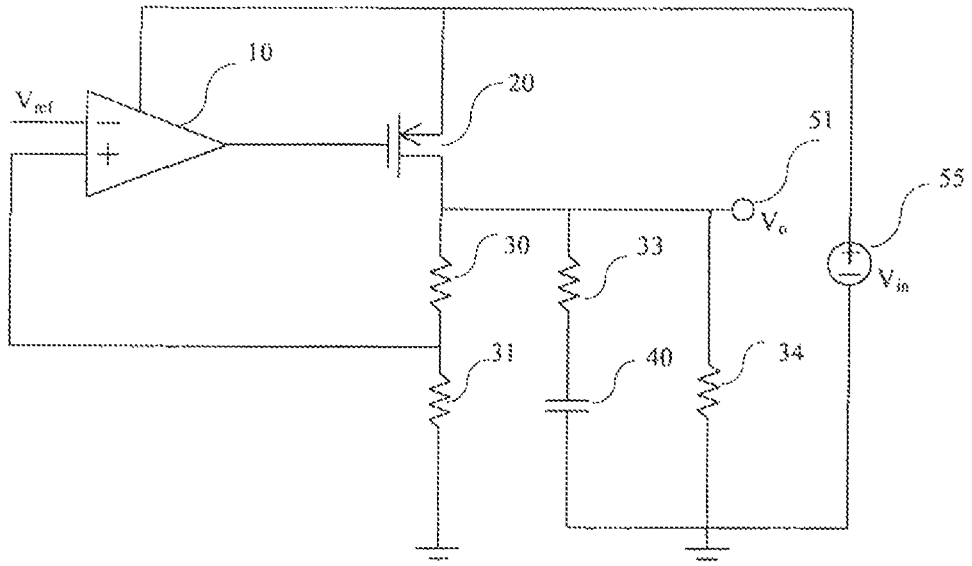
FIG. 1 is a circuit diagram of an existing voltage regulator circuit.
Figure 2:
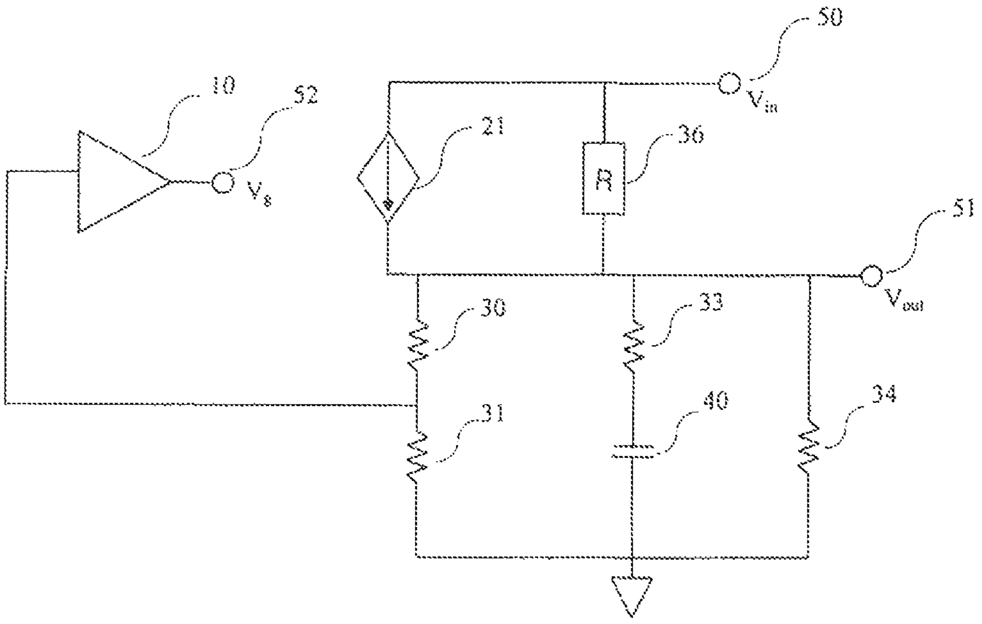
FIG. 2 is a small signal equivalent circuit diagram of a voltage regulator circuit.
Figure 3:
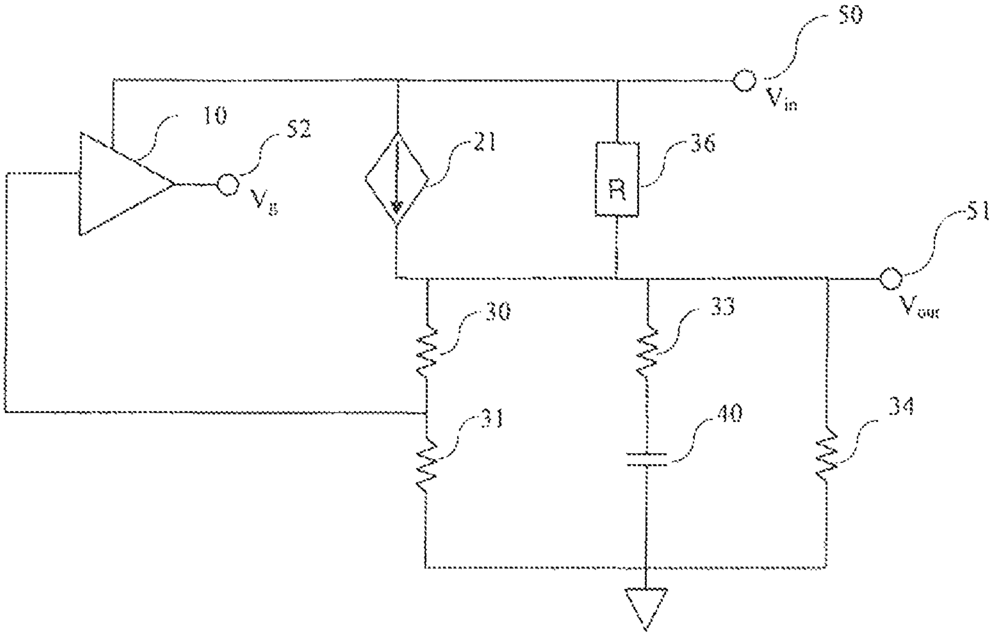
FIG. 3 is a another small signal equivalent circuit diagram of the voltage regulator circuit.

FIG. 3 is a circuit diagram of another small signal equivalent of the LDO in FIG. 1. In comparison with the small signal equivalent shown in FIG. 2, the input 50 of the power-supply $V_{in}$ of the LDO in FIG. 3 is coupled also to the error amplifier 10. Thereby, a more accurate model is obtained, taking into account variations in the supply voltage of the voltage regulator. Accordingly, the transfer function of the PSRR for the LDO in FIG. 3 is given by equation ② below. It should be noted that the terms “input 50 of the power-supply of the voltage regulator circuit” can be exchanged with the terms “the power-supply input 50 to the voltage regulator circuit”, which means that the input 50 is an input node through which the power-supply is connected to the voltage regulator.

$$PSRR = \frac{A_v}{A_{dd}} = \frac{V_{in}}{V_{out}} \approx \frac{A_{EA}\beta R_{op}G_{mp} + 1}{1 + G_{mp}(1 - A_{dd-EA})R_{op}} \quad ②$$

$A_v$ is the open-loop gain of negative feedback loop of the LDO shown in FIG. 3, $A_{dd}$ is the gain from the power-supply input to the output of the LDO, $V_{in}$ represents the voltage of power-supply input, and $V_{out}$ is the voltage of output 51 of the LDO.

$A_{EA}$ represents the differential gain of the error amplifier 10, β is the feedback factor, which is the ratio of the resistance of resistor 30 to the sum of the resistances of the resistor 30 and 31, $R_{op}$ is the drain source resistance of the power pass element 20, and $G_{mp}$ is the transconductance of the power pass element 20.

$G_{mp}$ represents the transconductance of the pass element 20, $A_{dd-EA}$ represents the power gain $V_g/V_{in}$, in which $V_g$ is the voltage of output node 52 of the amplifier 10 and $V_{in}$ is voltage of the input 50 of the power-supply of the LDO.

In the LDO shown in FIG. 3, without any compensation, $A_{dd\_EA}$ is generally close to 1 but less than 1, which makes the value of $G_{mp}(1-A_{dd-EA})R_{op}$ close or equal to zero and thereby makes the value of “$1+G_{mp}(1-A_{dd-EA})R_{op}$” of equation ② approximately equal to 1. In this case, the PSRR is mainly determined by the numerator of the equation ②, which is the open-loop gain of the LDO. Therefore, to increase the PSRR of the LDO, it is needed to increase the differential gain $A_{EA}$ of the error amplifier or increase the size of the power transistor in accordance with the conventional approach. It is difficult to keep the stability when the open-loop gain is increased.

Referring to the equation ②, it can be appreciated that if the value of “$1+G_{mp}(1-A_{dd-EA})R_{op}$” can be kept in the range from −0.1 to 0.1, i.e., the value of “$1+G_{mp}(1-A_{dd-EA})R_{op}$” meets the requirement shown by equation ③ as below, then the PSRR can be increased at least 20 dB.

$$-0.1<1+G_{mp}(1-A_{dd-EA})R_{op}<0.1 \quad ③$$

Further, in order to meet the requirement shown in equation ③, the power gain $A_{dd\_EA}$ of the error amplifier should be in the range given by ④.

$$1 + \frac{0.9}{R_{op} \cdot G_{mp}} < A_{dd\_EA} < 1 + \frac{1.1}{R_{op} \cdot G_{mp}} \quad ④$$

Figure 4:
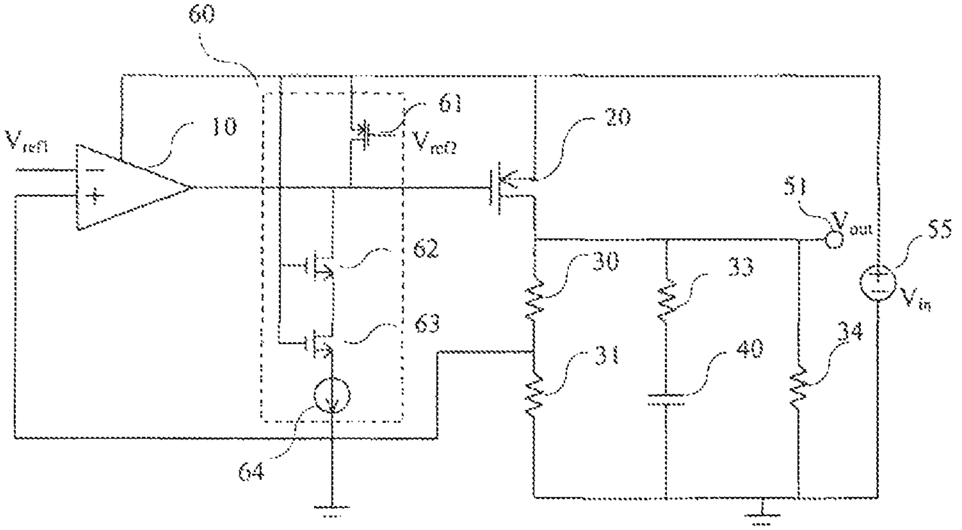
FIG. 4 is a block diagram of a voltage regulator circuit according to an embodiment of the present invention.

As an example embodiment, such LOO can be realized by the circuit shown in FIG. 4. The voltage regulator circuit shown in FIG. 4 includes an error amplifier 10, a pass element 20, feedback circuit comprising resistors 30 and 31, load resistors 33 and 34, a load capacitor 40, a power-supply 55, a first reference voltage Vref1, a compensation module 60, and output voltage Vout. According to this embodiment, the error amplifier 10 may include differential input stage and gain stage, as well as optionally include buffer stage. The pass element 20 is coupled to the input of the power-supply 55 of the voltage regulator circuit through its input terminal, coupled to the output of the error amplifier 10 through its control terminal, and coupled to the feedback circuit through its output terminal. The control terminal of the pass element 20 is coupled to the output of the error amplifier 10. The pass element may e.g. either be a P-type MOS transistor or a P-type bipolar transistor. With the pass element 20 being a P-type MOS transistor, its source terminal, gate terminal, and drain terminal are coupled to the power-supply 55 input to the voltage regulator circuit, the output of the error amplifier 10, and the feedback circuit, respectively. Also, if the pass element is a P-type bipolar transistor, the emitter terminal, base terminal, and collector terminal are coupled to the power-supply 55, the output of the error amplifier 10, and the feedback circuit, respectively. The feedback circuit, which has an input coupled to the output of the pass element 20 and an output coupled to a second input of the error amplifier, includes feedback resistors 30 and 31, in which the feedback resistor 30 is coupled to the output terminal of the pass element 20. The compensation module 60 includes a transistor 61 which works in its saturation region, and a balance unit comprising a first balance element 62, a second balance element 63 as well as a current source 64. The transistor 61 delivers the current from the power-supply 55 to the output of the error amplifier, and is used to control the power gain of the error amplifier 10. The balance unit is used to balance the quiescent current generated by the transistor 61, such as to counteract any adverse influence on the operation of the error amplifier 10 due to said quiescent current generated by the transistor 61. It should be noted that the balance unit can be omitted in the event that the current generated by the transistor 61 has no or a little effect on the operation of the error amplifier 10. As an example, the transistor 61 can be, but is not limited to, a P-type MOS transistor or P-type bipolar transistor. The source terminal, drain terminal, and gate terminal of the transistor 61 are coupled to the power-supply 55 input to the voltage regulator circuit, the output of the error amplifier 10, the second reference voltage node 61, respectively, when the transistor is a P-type MOS transistor. The emitter terminal, collector terminal, and the base terminal of the transistor 61 are coupled to the power-supply 55 input to the voltage regulator circuit, the output of the error amplifier 10, the second reference voltage node 61, respectively, when the transistor is a P-type bipolar transistor.

The balance unit is coupled between the output of the error amplifier 10 and ground. The control terminal, input terminal, and output terminal of the first balance element 62 are coupled to the input power-supply 55 input to the voltage regulator circuit, the output terminal of the transistor 61, and the input terminal of the second balance element 63, respectively. The control terminal of the second balance element is coupled to the power-supply 55 of the voltage regulator circuit, and the output terminal of the second balance element 63 is connected to ground via the current source 64. It should be understood that each of the first balance element 62 and the second element 63 may e.g. be a P-type MOS transistor or a P-type bipolar transistor. If any of the first balance element 62 and the second element 63 is P-type MOS transistor, then the control terminal is known as the gate terminal, the input terminal is known as the source terminal, and the output terminal is known as the drain terminal. If any of the first balance element 62 and the second element 63 is P-type bipolar transistor, then the control terminal is known as the base terminal, the input terminal is known as the emitter terminal, and the output terminal is known as the collector terminal.

In the existing conventional approach as described above, the output stage of the error amplifier is buffer stage so as to drive the power pass element. Thus the output stage of the error amplifier has a relatively low impendence. Accordingly, the $A_{dd\_EA}$ is approximately equal to but less than 1. In order to make the $A_{dd\_EA}$ satisfy the requirement shown in equation ④, compensation elements are needed to increase $A_{dd\_EA}$.

Still referring to FIG. 4, it can be appreciated that with its control terminal being coupled to the second voltage reference $V_{r2}$, which is an independent bias reference voltage so as not to be affected by the power-supply 55, the transistor 61 has the effect to increase the power gain of the combination of the error amplifier 10 and the compensation module 60, in which said power gain of the combination refers to the gain from the input of the power-supply 55 to the output of the error amplifier. Therefore, the transistor 61 contributes to increase the power gain of the combination of the error amplifier 10 and the compensation module 60 to the range shown in the equation CD, $$1+\frac{0.9}{R_{op}\cdot G_{mp}} < A'_{dd\_EA} < 1+\frac{1.1}{R_{op}\cdot G_{mp}} \qquad ⑤$$

$A'_{dd\_EA}$ represents the power gain of the combination of the error amplifier 10 and the compensation module 60, which corresponds to the $A_{dd\_EA}$ of equation ④.

Accordingly, the PSRR can be improved by means of adding the compensation module and thereby increasing the power gain of $V_g/V_{in}$ without changing the open-loop gain of the voltage regulator circuit.

It should be understood that in the embodiment above described, the transistor 61 serves as the element which helps to improving the power gain of the combination of the error amplifier and the compensation module, but it is used only for an example, not for limiting. The transistor 61 can be replaced by other element, which is able to adjust the power gain of the error amplifier, without departing from the scope of the invention.

What is claimed is:

1. A voltage regulator circuit, comprising:

an amplifier having a first input coupled to a first reference voltage node;

a power pass element having a control terminal coupled to an output of the amplifier, an input coupled to a power-supply input of the voltage regulator circuit, and an output coupled to an output of the voltage regulator circuit;

a feedback circuit having an input coupled to the output of the power pass element and an output coupled to a second input of the amplifier; and a compensation module comprising a transistor operating in a saturation region, wherein a gate or base terminal of the transistor is coupled to a second reference voltage node, a drain or collector terminal of the transistor is coupled to the output of the amplifier, and a source or emitter terminal of the transistor is coupled to the power-supply input of the voltage regulator circuit, the transistor operative to increase a power gain of a combination of the amplifier and the compensation module.

2. The voltage regulator circuit of claim 1, wherein the compensation module further comprises a balance unit coupled between the output of the amplifier and ground in order to balance the quiescent operation.

3. The voltage regulator circuit of claim 2, wherein the balance unit comprises a first balance element, a second balance element serially coupled to the first balance element, and a current source coupled between the second balance element and ground.

4. The voltage regulator circuit of claim 3, wherein a control terminal of each of the first balance element and second balance element is coupled to the power-supply input of the voltage regulator circuit, an input of the first balance element is coupled to the output of the transistor, and the output of the first balance element is coupled to an input of the second balance element.

5. The voltage regulator circuit of claim 1, wherein each of the power pass element and the transistor is one of a P-type MOS transistor and a P-type bipolar transistor.

6. The voltage regulator circuit of claim 5, wherein each of the first balance element and the second balance element is one of a P-type MOS transistor and a P-type bipolar transistor.

7. The voltage regulator circuit of claim 1, wherein the amplifier is error amplifier.

8. The voltage regulator circuit of claim 1, wherein a combination of the amplifier and the compensation module is configured such that the power gain of said combination is kept in the range of "1−σ1" to "1−σ2", where the value of σ1 is $$\frac{0.9}{R_{op}\cdot G_{mp}}$$

and the value of σ2 is $$\frac{1.1}{R_{op}\cdot G_{mp}},$$

in which the $R_{op}$ represents the drain-source resistance of the power pass element and the $G_{mp}$ represents the transconductance of the power pass element.

9. An electric apparatus comprising:

a voltage regulator circuit, comprising an amplifier having a first input coupled to a first reference voltage node;

a power pass element having a control terminal coupled to an output of the amplifier, an input coupled to a power-supply input of the voltage regulator circuit, and an output coupled to an output of the voltage regulator circuit;

a feedback circuit having an input coupled to the output of the power pass element and an output coupled to a second input of the amplifier; and a compensation module comprising a transistor operating in a saturation region, wherein a gate or base terminal of the transistor is coupled to a second reference voltage node, a drain or collector terminal of the transistor is coupled to the output of the amplifier, and a source or emitter terminal of the transistor is coupled to the power-supply input of the voltage regulator circuit, the transistor operative to increase a power gain of a combination of the amplifier and the compensation module.

* * * * *